(12) United States Patent
Aras

(10) Patent No.: US 11,226,028 B2
(45) Date of Patent: Jan. 18, 2022

(54) VARIABLE-SPEED GEAR ARRANGEMENT FOR A VEHICLE, VEHICLE COMPRISING THE VARIABLE-SPEED GEAR ARRANGEMENT, AND METHOD FOR ASSEMBLING THE VARIABLE-SPEED GEAR ARRANGEMENT

(71) Applicant: Schaeffler Technologies AG & Co. KG, Herzogenaurach (DE)

(72) Inventor: Resat Aras, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 16/335,706

(22) PCT Filed: Oct. 18, 2017

(86) PCT No.: PCT/DE2017/100895
§ 371 (c)(1),
(2) Date: Mar. 22, 2019

(87) PCT Pub. No.: WO2018/077341
PCT Pub. Date: May 3, 2018

(65) Prior Publication Data
US 2020/0032890 A1 Jan. 30, 2020

(30) Foreign Application Priority Data
Oct. 25, 2016 (DE) .......................... 102016220919.1

(51) Int. Cl.
*F16H 49/00* (2006.01)
*F01L 1/344* (2006.01)

(52) U.S. Cl.
CPC ............ *F16H 49/001* (2013.01); *F01L 1/344* (2013.01)

(58) Field of Classification Search
CPC .. F16H 49/001; F16H 2049/003; F01L 1/344; F01L 1/352; F01L 2001/3521; B25J 9/1025; F16D 1/06; F16D 1/076
(Continued)

(56) References Cited

U.S. PATENT DOCUMENTS 3,091,979 A 6/1963 Schaefer et al.
3,321,221 A * 5/1967 Harris ..................... F16B 21/10
403/241
(Continued)

FOREIGN PATENT DOCUMENTS

CN 102482955 A 5/2012
CN 103195533 A 7/2013
(Continued)

*Primary Examiner* — Jake Cook
*Assistant Examiner* — T. Scott Fix

(57) ABSTRACT

A variable-speed gear arrangement for a vehicle includes a harmonic drive device, a driven wheel and an optional stop disk. The stop disk can be arranged between the driven wheel and a shaft, with a fastener for connecting the shaft to the stop disk and the driven wheel. The fastener presses the shaft, the stop disk and the driven wheel together in an axial direction. The driven wheel and/or the shaft and/or the stop disk includes a deformation section, and the deformation section includes a contact surface and a deformation surface. In a first state of assembly, the deformation section brings a member of the clamping connection into contact with the contact surface, simultaneously forming a free deformation region. In a second state of assembly, the contact surface and the deformation surface are applied to the member of the clamping connection in a flat manner.

19 Claims, 3 Drawing Sheets

(58) Field of Classification Search
USPC .................................................. 74/411, 640
See application file for complete search history.

(56) References Cited

U.S. PATENT DOCUMENTS

| | | | | |
|---|---|---|---|---|
| 3,913,649 | A * | 10/1975 | Stanaitis | F16B 39/26 411/134 |
| 6,257,186 | B1 * | 7/2001 | Heer | F01L 1/024 123/90.17 |
| 6,302,073 | B1 * | 10/2001 | Heer | F01L 1/34 123/90.15 |
| 6,328,006 | B1 * | 12/2001 | Heer | F01L 1/34 123/90.11 |
| 10,508,726 | B2 * | 12/2019 | Hoshina | F16H 49/001 |
| 2002/0174742 | A1 * | 11/2002 | Kobayashi | F16C 33/60 74/640 |
| 2005/0217621 | A1 * | 10/2005 | Schafer | F01L 1/34 123/90.17 |
| 2006/0037430 | A1 * | 2/2006 | Kiyosawa | F16H 49/001 74/640 |
| 2007/0039414 | A1 * | 2/2007 | Takemura | F16H 49/001 74/640 |
| 2007/0261516 | A1 * | 11/2007 | Saito | F16H 49/001 74/640 |
| 2008/0047511 | A1 * | 2/2008 | Taye | F01L 1/352 123/90.17 |
| 2008/0060473 | A1 * | 3/2008 | Li | F16H 49/001 74/640 |
| 2008/0236527 | A1 * | 10/2008 | Schafer | F01L 1/34 123/90.17 |
| 2009/0199797 | A1 * | 8/2009 | Schafer | F01L 1/34 123/90.17 |
| 2011/0030632 | A1 | 2/2011 | Pascal et al. | |
| 2013/0327179 | A1 * | 12/2013 | Yeh | F16H 49/001 74/640 |
| 2013/0333515 | A1 * | 12/2013 | Yeh | F16H 49/001 74/640 |
| 2013/0333516 | A1 * | 12/2013 | Yeh | F16H 49/001 74/640 |
| 2014/0083245 | A1 * | 3/2014 | Yeh | F16H 49/001 74/640 |
| 2014/0165758 | A1 * | 6/2014 | Moune | F16H 49/001 74/412 R |
| 2015/0033906 | A1 * | 2/2015 | Kimus | F16H 49/001 74/568 R |
| 2015/0240674 | A1 * | 8/2015 | David | F01L 1/352 123/90.15 |
| 2015/0247563 | A1 * | 9/2015 | Yeh | F16H 49/001 74/457 |
| 2015/0354415 | A1 * | 12/2015 | David | F01L 1/344 123/90.17 |
| 2016/0025145 | A1 * | 1/2016 | Kobayashi | F16D 1/076 411/160 |
| 2016/0032790 | A1 * | 2/2016 | David | F01L 1/348 123/90.11 |
| 2016/0061308 | A1 * | 3/2016 | Oishi | F16H 49/001 74/640 |
| 2016/0245386 | A1 * | 8/2016 | Rossberger | B62M 23/00 |
| 2016/0251986 | A1 * | 9/2016 | Kohrs | F01L 1/352 123/90.15 |
| 2016/0348543 | A1 * | 12/2016 | Yamanaka | F16C 3/06 |

FOREIGN PATENT DOCUMENTS

| | | |
|---|---|---|
| CN | 103321704 A | 9/2013 |
| DE | 102004061451 A1 | 6/2006 |
| DE | 102014213597 A1 | 1/2016 |
| DE | 102016220919 A1 | 4/2018 |
| EP | 2574745 A1 | 4/2013 |
| JP | H0267405 A | 3/1990 |
| WO | 2004013467 A1 | 2/2004 |
| WO | 2016088277 A1 | 6/2016 |

* cited by examiner

VARIABLE-SPEED GEAR ARRANGEMENT FOR A VEHICLE, VEHICLE COMPRISING THE VARIABLE-SPEED GEAR ARRANGEMENT, AND METHOD FOR ASSEMBLING THE VARIABLE-SPEED GEAR ARRANGEMENT

CROSS-REFERENCE TO RELATED APPLICATIONS

This application is the U.S. National Phase of PCT Application No. PCT/DE2017/100895 filed Oct. 18, 2017 which claims priority to DE102016220919.1 filed Oct. 25, 2016, the entire disclosures of which are incorporated by reference herein.

TECHNICAL FIELD

This disclosure relates to a variable-speed gear arrangement for a vehicle and a method for assembling the variable-speed gear arrangement.

BACKGROUND

Camshafts are used to control valves in internal combustion engines, in motor vehicles for example. In simple embodiments, the camshaft and a crankshaft of the internal combustion engine are in a fixed phase relationship. However, there are also internal combustion engines in which the phase angle between the crankshaft and the camshaft is adjustable in order, for example, to set different opening and closing times for the valves at different engine speeds.

Strain wave gears are often employed as actuators for the adjustable camshaft. Strain wave gears are multiplying or transmission gear arrangements which are constructed from three subassemblies. A wave generator device often forms an input or an output around the strain wave gear and has an oval or elliptically shaped outer surface running around in the radial direction. This engages in a component generally referred to as a flex spline as a second subassembly, which is designed to have an elasticity such that it can be deformed in the radial direction by the wave generator device. External toothing is arranged on the radial outer side of the flex spline. As a third subassembly, the strain wave gear has a ring gear, which bears internal toothing. The external toothing of the flex spline generally engages in the internal toothing of the ring gear at two opposite positions. By means of a rotary motion of the wave generator device, the input positions between the external toothing and the internal toothing are moved in a direction of revolution. A difference in the number of teeth between the external toothing and the internal toothing results in a relative motion between the wave generator or the ring gear and the flex spline.

Document DE 10 2014 213 597 A1, which is probably the closest prior art, discloses a device for adjusting a camshaft for a vehicle. The device has a strain wave gear with a ring gear, wherein the ring gear is connected for conjoint rotation to the camshaft. The connection for conjoint rotation is accomplished by means of a screw passed through coaxially, wherein the screw head rests against a side wall of the ring gear and a thread of the screw is screwed into the camshaft, thus implementing a clamped assembly which connects the ring gear to the camshaft.

SUMMARY

It is the object of the present disclosure to improve the operating behavior of a variable-speed gear arrangement.

This object is achieved by a variable-speed gear arrangement, a vehicle having this variable-speed gear arrangement, and by a method for assembling a variable-speed gear arrangement, all described herein. Example embodiments of the disclosure will become apparent from the description below and from the attached figures.

This disclosure relates to a variable-speed gear arrangement which is suitable and/or designed, in particular, for a vehicle. The variable-speed gear arrangement has a shaft and a strain wave gear device. In particular, the shaft is a camshaft, such as an intake and/or an exhaust camshaft. Alternatively, the shaft is a crankshaft. In principle, the strain wave gear device can be designed as a hydraulic strain wave gear device. In an example embodiment, the strain wave gear device is designed as an electric strain wave gear device.

The strain wave gear device has a driven wheel, wherein the driven wheel defines a main axis of rotation, in particular with its axis of rotation and/or axis of symmetry. As an optional addition, the driven wheel has an integrated stop section. The driven wheel and the integrated stop section can be of integral design. As an alternative or as an optional addition, the strain wave gear device has a separate stop disk. In particular, the stop disk is arranged between the driven wheel and the shaft. The driven wheel and, optionally, the stop disk can have the function of adjusting the phase angle of the shaft, thus controlling the opening and closing times of the valves.

In particular, the strain wave gear device has a wave generator and a spur gear device. The wave generator can form an input and has an oval, in particular elliptical, main body. The main body is rotatable around a main axis of rotation of the strain wave gear. The wave generator can furthermore comprise a bearing device. The spur gear device—often referred to as a flex spline—has external toothing. The spur gear device furthermore has a radial inner side, in particular an inner circumference, which rests at least in some regions against the outer circumference of the bearing device. The spur gear device is designed to be deformable in such a way that it can be deformed by the wave generator, in particular into an oval and/or elliptical shape, in particular in accordance with the intended purpose.

In particular, the driven wheel is designed as a driven ring gear. The spur gear device is in engagement with the driven wheel and drives the driven wheel in the direction of revolution, thus ensuring that a rotary motion is transmitted to the driven wheel. In an example embodiment, the driven wheel bears internal toothing, wherein the internal toothing is in engagement with the external toothing only and/or exclusively in some regions. The internal toothing and the external toothing can be in engagement in precisely two engagement regions and are separated from one another in intermediate regions situated therebetween and/or are out of engagement in said regions.

Furthermore, the strain wave gear device has an external rotor, in particular a chain wheel, wherein the driven wheel and, where applicable, the stop disk are rotatable relative to the external rotor. The stop section or, optionally, the stop disk serve to limit a rotation angle, thus ensuring that a rotation of the driven wheel and, where applicable, of the stop disk and/or of the external rotor is limited to a defined rotation angle.

The variable-speed gear arrangement has a fastener, wherein the shaft is optionally connected to the stop disk and the driven wheel by the fastener. In principle, the fastener can be designed as a screwing device and/or as a clamping device. The fastener can be a cylinder head bolt or a hexagon bolt, for example. In an example embodiment, however, the fastener is a central screw.

The fastener presses the shaft and, where applicable, the stop disk and the driven wheel together in the axial direction, thereby forming a clamped assembly. In this way, it is possible to transmit a rotary and/or pivoting motion of the driven wheel and, where applicable, of the stop disk to the shaft. In particular, the clamped assembly is designed in such a way that the driven wheel and, where applicable, the stop disk are connected frictionally to the shaft.

In particular, the fastener is aligned coaxially with the shaft, wherein the drive wheel and, where applicable, the stop disk and the shaft are arranged between a head of the fastener and an end region of the fastener and are pressed together by the fastener, thus ensuring that the deformation section, in particular the deformation surface, is deformed and the second assembly state is achieved. The head can be of wider design than the end region in the radial direction relative to the longitudinal extent of the fastener, the head being implemented as a hexagon head or a cylinder head bolt, for example. The end region of the fastener can be provided with a thread, and thus it is or can be screwed into the shaft or into a component firmly connected to the shaft.

In particular, the clamped assembly comprises at least the shaft and the driven wheel as clamped joint partners. As an optional addition, the clamped assembly comprises the stop disk and/or a further component of the variable-speed gear arrangement as clamped joint partners.

Within the scope of this disclosure, it is proposed that one clamped joint partner has a deformation section, wherein the deformation section has a contact surface and a deformation surface. The deformation section serves to define a friction radius and/or a center of pressure, wherein the friction radius and/or center of pressure are/is defined, in particular, via the contact surface. In particular, the driven wheel and/or the shaft and/or the stop disk have/has the deformation section.

In a first assembly state, the deformation section brings a different clamped joint partner into contact with the contact surface and the deformation surface simultaneously forms a free deformation region in relation to the clamped joint partner, wherein the contact surface is arranged radially on the outside in relation to the deformation region. The deformation surface directly adjoins the contact surface radially in the direction of the main axis of rotation. The deformation section can be formed by the deformation surface and the contact surface. In particular, the free deformation region is an air gap which is defined in the axial direction by the deformation surface and the clamped joint partner and in the radial direction by the contact surface.

More specifically, the contact surface can be a circular ring surface. In particular, the circular ring surface has a circular ring width of less than 2 mm, potentially less than 1 mm, or, even less than 0.1 mm. In the first assembly state, the contact surface rests against the clamped joint partner, potentially against the bearing surface, in the axial direction in relation to the main axis of rotation, more particularly positively and/or frictionally. The contact surface can rest against the bearing surface completely in the direction of revolution.

In particular, at least two clamped joint partners are connected to one another, thus forming the clamped joint. In principle, both clamped joint partners can have the deformation section. In an example embodiment, only one of the two clamped joint partners has the deformation section. In particular, one of the clamped joint partners has at least one bearing surface. The bearing surface can extend in a radial plane relative to the main axis of rotation. In the first assembly state, the contact surface can rest against the bearing surface.

In a second assembly state, the contact surface and the deformation surface rest flat against the other clamped joint partner. In particular, the deformation section, or the contact surface and the deformation surface, rest positively and/or frictionally against the clamped joint partner, such as the bearing surface, in the axial direction and/or in the direction of revolution. In principle, the deformation region is smaller in the second assembly state than in the first assembly state. In an example embodiment, however, the deformation region is no longer present, and therefore the air gap is closed.

As an alternative or as an optional addition, the deformation section, in particular the deformation surface and/or the contact surface rest against the bearing surface completely or partially in the radial direction in relation to the main axis of rotation in the second assembly state. In particular, the deformation section extends over more than 50%, possibly more than 80%, or even more than 90%, of the radial extent of the bearing surface in the radial direction in relation to the main axis of rotation. In an example embodiment, the deformation surface extends in a radial plane relative to the main axis of rotation in the second assembly state.

The advantage of this disclosure consists in that the friction radius remains virtually constant during the tightening of the screwing means by virtue of the configuration according to the deformation section. Moreover, depending on the configuration of the deformation section or depending on the arrangement of the contact surface, a maximum friction radius can be set. Another advantage is that a higher friction torque is produced by the deformation section. Thus, slipping of the individual components of the strain wave gear device is reduced and operating reliability is increased. Moreover, the simple configuration allows low-cost production of the deformation section.

In an example embodiment, the free deformation region extends in a manner converging radially in the direction of the contact surface in relation to the main axis of rotation, when viewed in a longitudinal section along the main axis of rotation. In particular, the contact surface closes off the deformation region with respect to the outside in the radial direction. The deformation region can have the same or a similar longitudinal section throughout in the direction of revolution. In particular, the free deformation region is curved or converges in a straight line in the radial direction.

In an example embodiment, the deformation section, in particular the deformation surface, is concave or conical in the first assembly state. By virtue of the concave or conical configuration of the deformation section, first the contact surface and then the deformation surface come to rest against the clamped joint partner as the fastener is tightened during assembly of the strain wave gear device. In particular, the deformation surface and/or the contact surface are of concave or conical design. The deformation surface and/or the contact surface are/is can be a surface of revolution formed by a curve and/or sloping line rotating around the main axis of rotation. For example, the deformation surface is an inward-oriented tapering annular surface. The deformation section can be formed by turning, more specifically hard turning, and/or by forming.

In particular, the deformation section, for example, the deformation surface and/or the contact surface are/is bent straight in the second assembly state. As an alternative or as an optional addition, the deformation section provides a mating contour with respect to the bearing surface in the second assembly state, thus ensuring that the deformation section rests completely against the clamped joint partner.

The strain wave gear device can be designed as a variable cam timing (VCT) system or as a variable compression ratio (VCR) system and/or as an electric shaft adjusting device. In particular, the VCT system can be used to control the intake and/or exhaust valves of an internal combustion engine of the vehicle. The VCT system can be used to adjust the phase angle of the camshaft relative to the phase angle of a crankshaft of the vehicle. In particular, the VCR system can be used to change the compression ratio of a reciprocating-piston machine. In particular, the electric strain wave gear device can be designed to adjust the camshaft and/or the crankshaft. In an example embodiment, the strain wave gear device is an electric camshaft adjuster or an electric compression adjuster.

In particular, in a first assembly step, the contact surface is brought into contact with the clamped joint partner, with the result that the deformation surface forms the free deformation region in relation to the clamped joint partner, and the first assembly state is formed. In a second assembly step, the fastener can be screwed in axially in the direction of the shaft, wherein the deformation section is deformed, with the result that the deformation surface rests flat against the clamped joint partner and the second assembly state is formed.

In an example embodiment, the driven wheel has an internally toothed section and a receiving section for receiving the shaft or, where applicable, for receiving the stop disk. The internally toothed section has, in particular, the internal toothing, wherein the driven wheel is designed as the driven ring gear. The receiving section can be a rotationally symmetrical extension, wherein, in an example embodiment, the receiving section has a cylindrical shape, being a hollow cylinder for example. In an example embodiment, the receiving section delimits the deformation region radially in the direction of the main axis. The receiving section is furthermore designed to receive the fastener. In particular, the fastener is passed coaxially through the receiving section. For example, a cylindrical lateral surface of the receiving section is designed to receive the shaft or alternatively to receive the stop disk. As an optional addition, an axial bore of the receiving section is designed to receive the fastener. The internally toothed section and/or the receiving section extend/extends in the axial direction parallel to the main axis of rotation.

The two sections are offset radially relative to one another in relation to the main axis of rotation, wherein the deformation section is arranged between the internally toothed section and the receiving section. In particular, the driven wheel has a Z shape when viewed in a longitudinal section. The two horizontal limbs can be formed by the internally toothed section and the receiving section, and the vertically or diagonally extending limb connecting the two horizontal limbs is formed by the deformation section. In an example embodiment, the sections are connected directly to one another, thus forming the driven wheel. By way of example, the driven wheel is manufactured integrally, e.g. from a casting, forged or produced by powder metallurgy. In an example embodiment, the shaft or, alternatively, the stop disk is the clamped joint partner for the driven wheel.

In an alternative or optional additional embodiment of the disclosure, the deformation section is arranged on at least one shaft end face of the shaft. In particular, the deformation section extends completely over the entire shaft end face in the radial direction in relation to the main axis of rotation. As an alternative, the deformation section extends partially over the entire shaft end face in the radial direction. In an example embodiment, the clamped joint partner for the shaft is the driven wheel or, alternatively, the stop disk.

In an example embodiment, the strain wave gear device has the stop disk, wherein the stop disk is arranged between the driven wheel and the shaft. In particular, the stop disk is designed as the clamped joint partner for the driven wheel and/or the shaft.

In another specific implementation of the disclosure, the stop disk has a first and a second stop disk end face, wherein a further deformation section is arranged on the first and/or the second stop disk end face. In particular, the further deformation section extends completely over the entire first and/or second stop disk end face in the radial direction in relation to the main axis of rotation. As an alternative, the further deformation section extends partially over the first and/or second stop disk end face in the radial direction. In an example embodiment, the clamped joint partner for the stop disk is the shaft and/or the driven wheel.

In one specific implementation, the free deformation region is no more than 0.1 mm in the axial direction in relation to the main axis of rotation. In particular, the deformation surface is bent straight by 0.1 mm in a controlled elastic manner during the assembly of the variable-speed gear arrangement.

This disclosure furthermore relates to a method for assembling the variable-speed gear arrangement of the kind described above.

BRIEF DESCRIPTION OF THE DRAWINGS

Further features, advantages and effects of this disclosure will become apparent from the following description of illustrative embodiments of the disclosure. In the drawings.

In the figures, corresponding or identical parts are in each case provided with the same reference signs.

DETAILED DESCRIPTION

Figure 1:
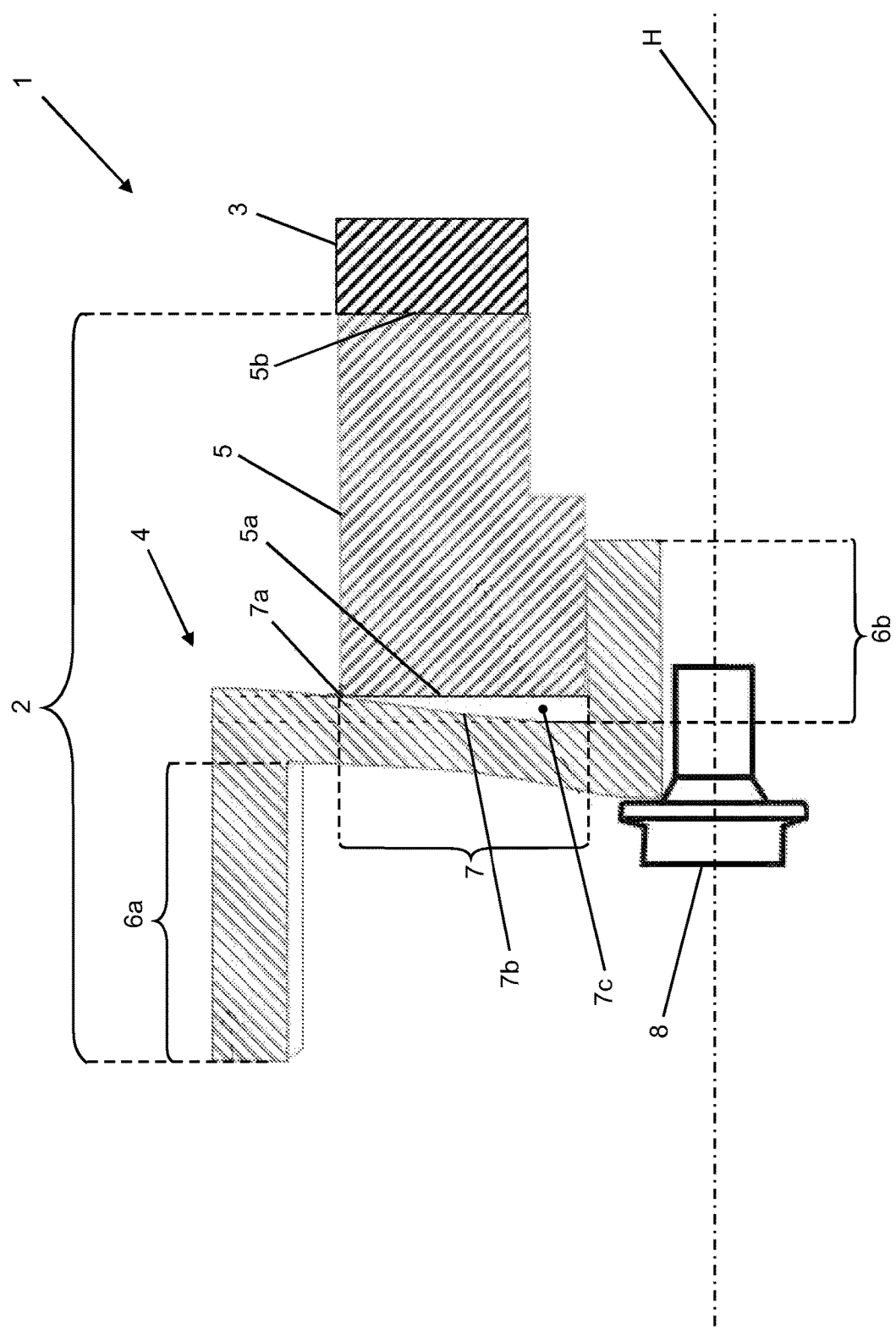
FIG. 1 shows a schematic longitudinal section through a variable-speed gear arrangement in a first assembly state as an illustrative embodiment of the disclosure.

FIG. 1 shows a longitudinal section through a variable-speed gear arrangement 1 along a main axis of rotation H in a first assembly state. The variable-speed gear arrangement 1 has a strain wave gear device 2 and a shaft 3, which is indicated only schematically. The strain wave gear device 2 is designed and/or suitable for adjusting the shaft 3. The strain wave gear device 2 is an electric shaft adjuster for adjusting a phase angle of the shaft 3, for example. The strain wave gear device 2 is connected for conjoint rotation to the shaft 3, and therefore a rotary motion of the strain wave gear device 2 is transmitted to the shaft 3. The strain wave gear device 2 is arranged in series in terms of gearing between a crankshaft and the shaft 3, for example.

The strain wave gear device 2 has a driven wheel 4 and a stop disk 5. The stop disk 5 is arranged coaxially and/or concentrically with the driven wheel 4. The driven wheel 4 and the stop disk 5 form an output, wherein the shaft 3 is coupled for conjoint rotation to the stop disk 5. By way of example, the stop disk 5 and the shaft 3 can also be of integral design, or the shaft 3 has an integrated stop section. The shaft 3 is arranged coaxially with the stop disk 5 and/or with the driven wheel 4.

By way of example, the driven wheel 4 is designed as a driven ring gear. The driven wheel 4 has an internally toothed section 6a, a deformation section 7 and a receiving section 6b. By way of example, a flex ring meshes with the internally toothed section 6a, imparting rotation to the ring gear around the main axis of rotation H. The receiving section 6b forms a receptacle for the stop disk 5. The receiving section 6b is a rotationally symmetrical extension, for example, wherein the receiving section 6b and the stop disk 5 form a positive joint in the radial direction in relation to the main axis of rotation H. By way of example, the driven wheel 4 is manufactured integrally, e.g. from a casting, forged, produced by power metallurgy etc., wherein the deformation section 7 is formed by hard turning, for example.

The internally toothed section 6a and the receiving section 6b extend in the axial direction parallel to the main axis of rotation H. The internally toothed section 6a and the receiving section 6b are offset in the radial direction relative to one another, wherein the deformation section 7 extends between the internally toothed section 6a and the receiving section 6b and connects these directly to one another. In the sectional illustration shown, the driven wheel 4 has a Z shape, wherein the two horizontal limbs are formed by the internally toothed section 6a and the receiving section 6b and the diagonal connecting limb is formed by the deformation section 7.

The deformation section 7 has a contact surface 7a and a deformation surface 7b. The contact surface 7a or the deformation surface 7b have a concave shape. The stop disk 5 has a first and a second stop disk end face 5a, b. The contact surface 7a rests against the first stop disk end face 5a in the axial direction. The shaft 3 rests against the second stop disk end face 5b in the axial direction in relation to the main axis H. The contact surface 7a is a circular ring surface, for example, wherein the contact surface 7a makes contact with the first stop disk end face 5a in the direction of revolution. The deformation surface 7b extends from the contact surface 7a in the direction of the main axis of rotation H and defines a free deformation region 7c. The contact surface 7a is arranged radially on the outside in relation to the free deformation region 7c.

The deformation region 7c is, for example, an air gap in the direction of revolution in relation to the main axis of rotation, said gap being defined in the axial direction by the deformation surface 7b and the first stop disk end face 5a and in the radial direction by the contact surface 7a and the receiving section 6b. The deformation region 7c extends in a manner converging radially in the direction of the contact surface 7a in relation to the main axis of rotation H.

The connection between the shaft 3 and the strain wave gear device 2 is made by means of a fastener 8, wherein, in particular, the fastener 8 has a head and an end region. The end region is provided with a thread, thus enabling the fastener 8 to be screwed coaxially into the shaft 3. In particular, the fastener 8 is designed as a central screw, e.g. a hexagon screw.

Figure 2:
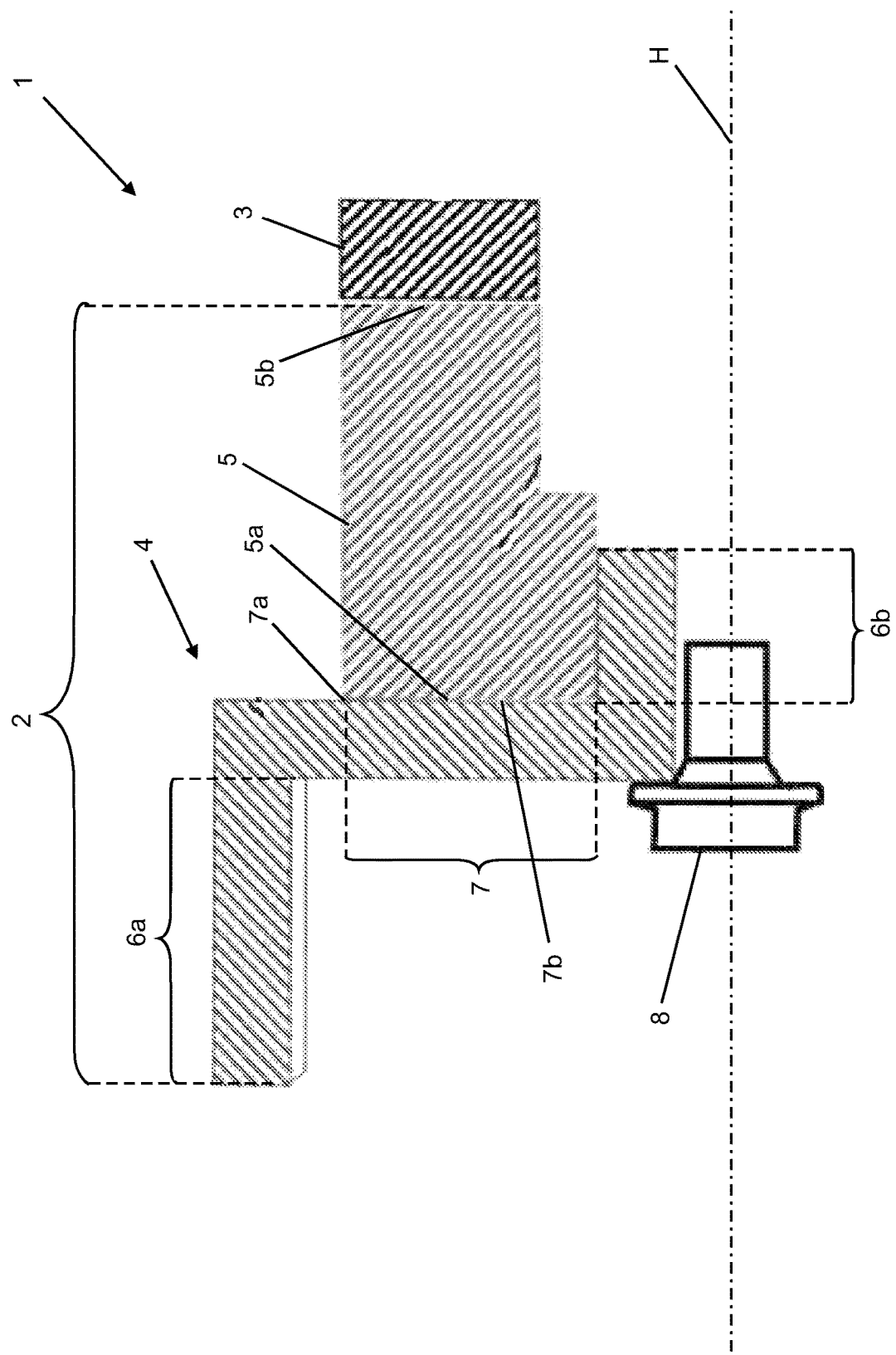
FIG. 2 shows the variable-speed gear arrangement illustrated in the same way as in FIG. 1 in a second assembly state.

FIG. 2 shows the variable-speed gear arrangement 1 illustrated in the same way as in FIG. 1 in a second assembly state. For this purpose, the fastener 8 is screwed into the shaft 3 in the axial direction in relation to the main axis of rotation H. During this process, the deformation surface 7b is bent straight, with the result that the free deformation region 7c decreases further in size until the deformation surface 7b rests flat against the first stop disk end face 5a. The concave shape of the deformation surface 7b ensures that the friction radius, in particular a region with a high surface pressure, remains radially far on the outside, in particular in the region of the contact surface 7a, in the second assembly state, as the fastener 8 is tightened.

In the second assembly state, the driven wheel 4, the stop disk 5 and the shaft 3 form a clamped assembly, wherein the clamped assembly is formed in such a way that the driven wheel 4, the stop disk 5 and the shaft 3 are connected frictionally to one another. By way of example, the deformation section 7, in particular the contact surface 7a and the deformation surface 7b forms a positive joint together with the first stop disk end face 5a in the axial direction in relation to the main axis of rotation H.

Figure 3:
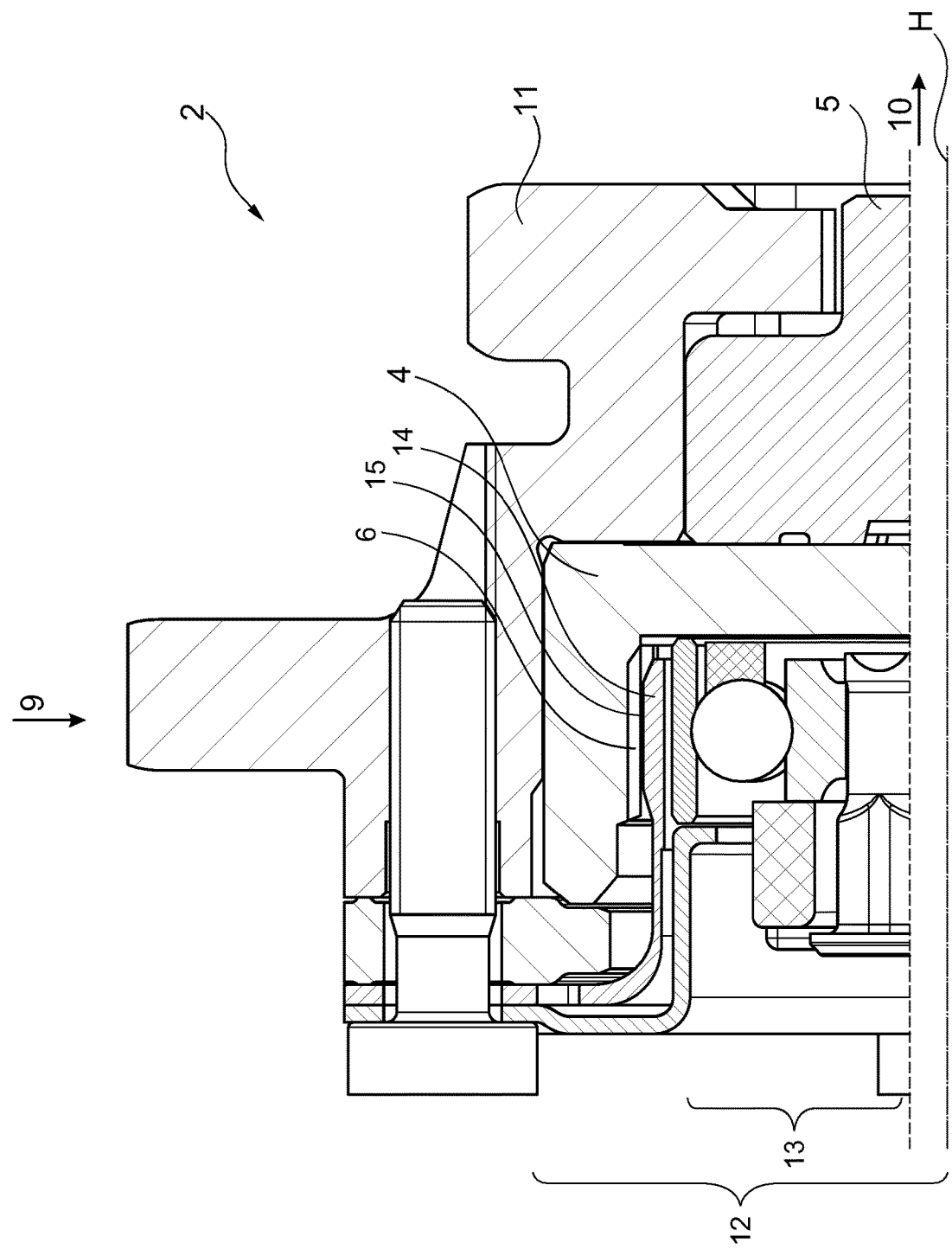
FIG. 3 shows a schematic longitudinal section through a segment of the strain wave gear device.

FIG. 3 shows a schematic longitudinal section through a segment of the adjusting device 1. The adjusting device 1 is used to adjust the phase angle of a shaft of an internal combustion engine relative to the phase angle of a crankshaft of the internal combustion engine.

The adjusting device 1 has an input 9, which is designed as a gearwheel body 11, and an output 10, which is designed as a shaft coupled for conjoint rotation to the driven wheel 4. The input 9 is connected by gearing to the crankshaft, while the output 10 is connected by gearing to the shaft 3 or is formed by the shaft 3. The shaft 3 can be arranged coaxially with the output 10, for example.

The adjusting device 1 has a strain wave gear 12 in order to produce a relative rotation between the input 9 and the output 10 so as to change the phase angle between the crankshaft and the shaft. The strain wave gear 12 is formed by a wave generator 13, the driven wheel 4 and a spur gear device 14. The strain wave gear 13 is also referred to as a harmonic drive.

The wave generator 13 has an elliptical shape in an axial plan view and can be made to rotate by a drive (not shown). The spur gear device 14 has an externally toothed section 15 and is designed as an elastic and/or flexible sleeve in this region. The wave generator 13 makes contact with the spur gear device 14 on the radial inner side.

The internally toothed section 6a, which is in engagement with the externally toothed section 15 in two engagement regions. The number of teeth of the externally toothed section 15 and of the internally toothed section 6a are designed to be different, and therefore progress of the engagement regions in the direction of revolution around a main axis H of the adjusting device 2 leads to a relative rotation between the driven wheel 4 and the spur gear device 14.

LIST OF REFERENCE CHARACTERS 1 variable-speed gear arrangement
2 strain wave gear device
3 shaft
4 drive wheel
5 stop disk
5a first stop disk end face
5b second stop disk end face
6a internally toothed section
6b receiving section
7 deformation section
7a contact surface
7b deformation surface
7c deformation region
8 fastener
9 input 10 output
11 gearwheel body
12 strain wave gear
13 wave generator
14 spur gear device
15 externally toothed section

The invention claimed is:

1. A variable-speed gear arrangement for a vehicle, the variable-speed gear arrangement comprising:
a shaft,
a strain wave gear device for adjusting the shaft, the strain wave gear device including a driven wheel, the driven wheel having a main axis of rotation,
a fastener, the shaft connected to the driven wheel by the fastener, the fastener pressing the shaft and the driven wheel together in an axial direction, forming a clamped assembly, the clamped assembly comprising at least the shaft and the driven wheel as clamped joint partners, and,
at least one of the clamped joint partners having a deformation section, the deformation section including a contact surface and a deformation surface, wherein:
in a first assembly state:
an end face of a different one of the clamped joint partners contacts the contact surface, the deformation surface simultaneously forming a free deformation region in relation to the different one of the clamped joint partner, and,
the contact surface is arranged radially outside of the free deformation region, and,
in a second assembly state, the contact surface and the deformation surface rest flat against the end face of the different one of the clamped joint partners, the end face arranged perpendicularly to the main axis of rotation.

2. The variable-speed gear arrangement as claimed in claim 1, wherein, in the first assembly state, the free deformation region converges radially towards the contact surface when viewed in a longitudinal section along the main axis of rotation.

3. The variable-speed gear arrangement as claimed in claim 1, wherein, in the first assembly state, the deformation section is concave or conical.

4. The variable-speed gear arrangement as claimed in claim 1, wherein the driven wheel has a receiving section and an internally toothed section, the receiving section offset from the internally toothed section, and the deformation section extending between the internally toothed section and the receiving section.

5. The variable-speed gear arrangement as claimed in claim 1, wherein the shaft has at least one shaft end face, and the deformation section is arranged on the shaft end face.

6. The variable-speed gear arrangement as claimed in claim 1, further comprising a stop disk, the stop disk arranged as one of the clamped joint partners of the clamped assembly between the driven wheel and the shaft.

7. The variable-speed gear arrangement as claimed in claim 1, wherein the free deformation region is no more than 0.1 mm in the axial direction.

8. A method for assembling the variable-speed gear arrangement of claim 1, comprising:
bringing the contact surface into contact with the different one of the clamped joint partners, the deformation surface forming the free deformation region with the different one of the clamped joint partners, defining the first assembly state, and
screwing the fastener in axially in a direction of the shaft, deforming the deformation section, the deformation surface resting flat against the different one of the clamped joint partners, defining the second assembly state.

9. The variable-speed gear arrangement of claim 1, wherein the strain wave gear device further comprises a rolling element bearing.

10. The variable-speed gear arrangement of claim 1, wherein the contact surface is a circular ring surface.

11. The variable-speed gear arrangement of claim 1, wherein the free deformation region is defined: (i) in the axial direction by the deformation surface and the different one of the clamped joint partners; and, (ii) in a radial direction by the contact surface.

12. The variable-speed gear arrangement of claim 1, wherein the driven wheel has a z-shape when viewed in a longitudinal section.

13. The variable-speed gear arrangement of claim 1, wherein the fastener directly contacts only a portion of the driven wheel arranged radially inwardly of the contact surface.

14. A variable-speed gear arrangement for a vehicle, the variable-speed gear arrangement comprising:
a shaft;
a strain wave gear assembly for adjusting the shaft, the strain wave gear assembly including a driven wheel, the driven wheel having a main axis of rotation;
a fastener, the shaft connected to the drive wheel by the fastener, the fastener axially clamping the shaft and the driven wheel together forming a clamped assembly, the clamped assembly comprising at least the shaft and the driven wheel as clamped joint partners; and,
at least one of the clamped joint partners having a deformation section, the deformation section including a contact surface and a deformation surface; wherein:
in a first assembly state:
an end face of a different one of the clamped joint partners contacts the contact surface, the deformation surface forming a first free deformation region in relation to the different one of the clamped joint partners; and,
in a second assembly state, the deformation surface deforms against the end face of the different one of the clamped joint partner to form a second free deformation region, the second free deformation region smaller than the first free deformation region, and the end face arranged perpendicularly to the main axis of rotation.

15. The variable-speed gear arrangement of claim 14, wherein in the second assembly state, the contact surface and the deformation surface rest flat against the different one of the clamped joint partners.

16. The variable-speed gear arrangement of claim 14, wherein the contact surface is arranged radially outside of the first free deformation region.

17. The variable-speed gear arrangement as claimed in claim 14, further comprising a stop disk arranged as one of the clamped joint partners between the driven wheel and the shaft, and the end face is arranged on the stop disk.

18. The variable-speed gear arrangement of claim 14, wherein the fastener directly contacts the driven wheel to axially clamp the shaft and driven wheel together.

19. A method for assembling a variable-speed gear arrangement, comprising:
bringing a contact surface of a strain wave gear assembly into contact with an end face of a clamped joint partner, forming a first free deformation region and defining a first assembly state, the clamped joint partner comprising at least a driven wheel of the strain wave gear assembly and a shaft, the strain wave gear assembly having a main axis of rotation; and, fastening the driven wheel to the shaft in an axial direction, deforming the first free deformation region against the end face to form a second free deformation region smaller than the first free deformation region and defining a second assembly state, and the end face arranged perpendicularly to the main axis of rotation.

\* \* \* \* \*